(12) United States Patent
Makino (10) Patent No.: US 8,154,618 B2
(45) Date of Patent: Apr. 10, 2012

(54) IMAGING APPARATUS AND METHOD FOR SETTING THE SAME

(75) Inventor: Jun Makino, Kokubunji (JP)

(73) Assignee: Canon Kabushiki Kaisha, Tokyo (JP)

( * ) Notice: Subject to any disclaimer, the term of this patent is extended or adjusted under 35 U.S.C. 154(b) by 464 days.

(21) Appl. No.: 12/395,044

(22) Filed: Feb. 27, 2009

(65) Prior Publication Data

US 2009/0219414 A1    Sep. 3, 2009

(30) Foreign Application Priority Data

Feb. 29, 2008  (JP) ................ 2008-050130

(51) Int. Cl.
*H04N 9/73* (2006.01)
(52) U.S. Cl. ............ 348/223.1; 348/224.1; 348/362; 348/254; 348/255; 348/671
(58) Field of Classification Search .... 348/223.1–229.1, 348/362, 254, 255, 671, 674; 382/274; 358/519
See application file for complete search history.

(56) References Cited

U.S. PATENT DOCUMENTS

| | | | |
|---|---|---|---|
| 5,128,769 A * | 7/1992 | Arai et al. ............ | 348/363 |
| 5,221,963 A | 6/1993 | Hashimoto | |
| 5,343,246 A | 8/1994 | Arai | |
| 2004/0207736 A1 * | 10/2004 | Muramatsu ............ | 348/254 |

FOREIGN PATENT DOCUMENTS

| | | |
|---|---|---|
| JP | 03-204281 A | 9/1991 |
| JP | 03-285470 A | 12/1991 |

\* cited by examiner

*Primary Examiner* — Yogesh Aggarwal (74) *Attorney, Agent, or Firm* — Canon U.S.A., Inc. I.P. Division (57) ABSTRACT

An imaging apparatus includes an acquiring unit configured to acquire a representative value of a luminance level in a main object area and a plurality of representative values of luminance levels in peripheral areas of the main object area in an image obtained by an imaging unit, a calculation unit configured to calculate a plurality of relative values between the respective plurality of representative values of luminance levels in the peripheral areas and the representative value of a luminance level in the main object area, which are acquired by the acquiring unit, a setting unit configured to set intensity of knee processing based on the plurality of relative values calculated by the calculation unit, and a knee processing unit configured to execute the knee processing on an image acquired by the imaging unit according to the intensity set by the setting unit.

16 Claims, 5 Drawing Sheets

IMAGING APPARATUS AND METHOD FOR SETTING THE SAME

BACKGROUND OF THE INVENTION

1. Field of the Invention

The present invention relates to an imaging apparatus, such as a video camera or a digital camera, and more particularly to the gradation correction of luminance level signals.

2. Description of the Related Art

An imaging apparatus, such as a video camera or a digital camera, conventionally obtains an image signal using an image sensor, such as a charge-coupled device (CCD) sensor or a complementary metal-oxide semiconductor (CMOS) sensor. Such an image sensor has a narrow range of gradation expression, which expresses from black level to white level. Therefore, the obtained image signals cannot sufficiently express the gradation range of an actual object image. The gradation range is further limited in an expression range of the digital signals in a system, in which image signals are digitalized and recorded. In order to solve the problem, conventionally, knee processing, which compresses the high luminance range of image signals to expand the gradation range to be expressed, is widely used.

Figure 5:
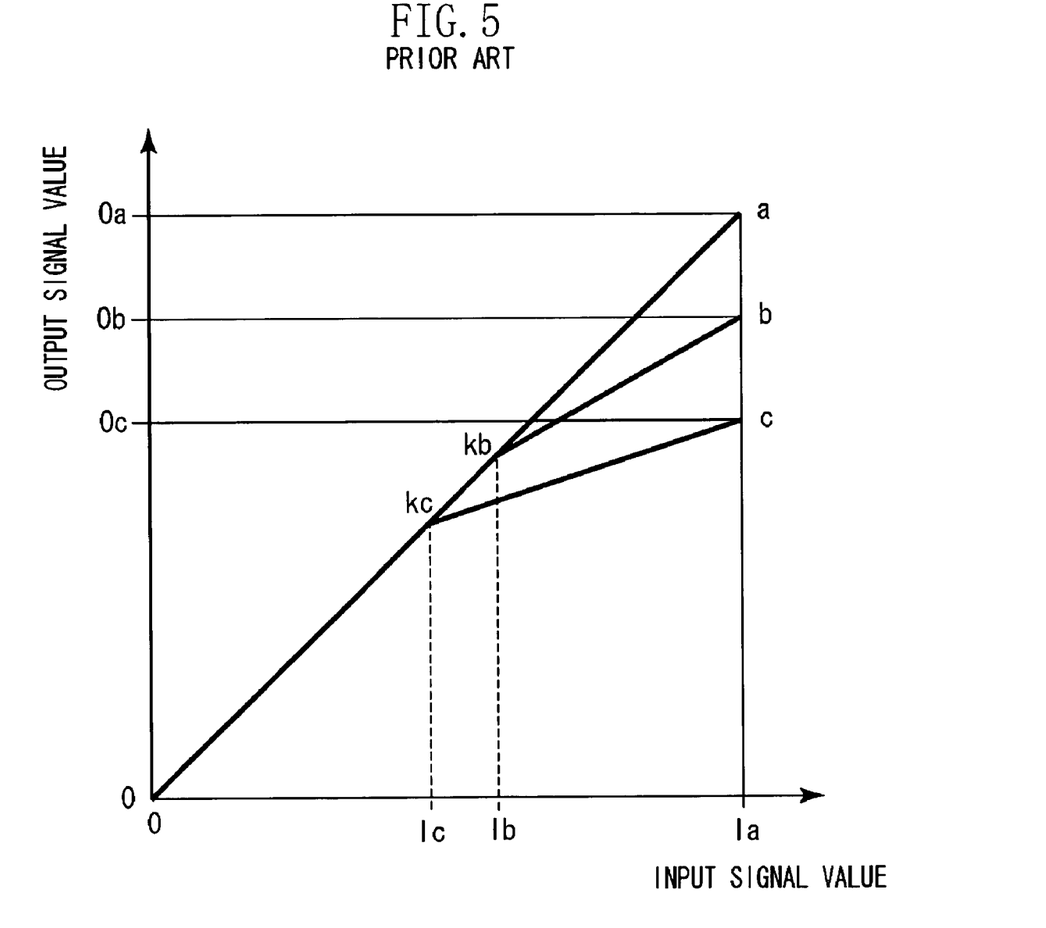
FIG. 5 is a diagram illustrating input/output characteristics of knee processing.

Input/output characteristics and the gradation range of the knee processing are described referring to FIG. 5. In FIG. 5, the horizontal axis indicates an input signal value while the vertical axis indicates an output signal value after the knee processing is performed. Respective straight lines indicate input/output characteristics in a case where the knee processing is varied. In a case where no knee processing is executed, the input/output characteristics are expressed in a straight line indicated by a, that is, an output signal value is similar to an input signal value. In other words, the range of the input signal value Ia is equal to the range of the output signal value Oa. In a case where the knee processing is executed, the input/output characteristics transfer from the straight line a to a straight line b or c. In the characteristics of the straight line b, the output signal values are similar to the input signal values up to the input signal value Ib, similar to the case where no knee processing is executed. In contrast, the gradation of the output signal values is compressed in the high luminance range where the input signal value is larger than the value Ib. As a result, the input signal range between values 0 and Ia is compressed in the output range between values 0 and Ob. In the case of the straight line c, the gradation of the output signal values is similarly compressed in a high luminance range where the input signal value is larger than the value Ic. As a result, the input range between values 0 and Ia is compressed in the output range between values 0 and Oc.

Thus, by applying the knee processing to the input signals, the input signals can be compressed, and the gradation range to be expressed practically can be expanded. The starting points kb and kc of the polygonal lines in the respective characteristics are referred to as a knee point and the slope of the straight line after the knee point is referred to as a knee slope. When the knee processing is to be intensified, shifting the knee point to the lower side or reducing the angle of the knee slope is generally executed.

By executing the knee processing as described above, the gradation range for an object in a backlight state or for an image including a high luminance object can be corrected. Setting an amount of correction, that is, the knee intensity is also executed depending on the image state of the object. For example, Japanese Patent Application Laid-Open No. 03-204281 discusses a method for setting the knee intensity based on the detection result of a plurality of light metering areas. Japanese Patent Application Laid-Open No. 03-285470 discusses a method for setting the knee intensity based on an average luminance signal of the entire image plane and a luminance signal in the center of the image plane.

According to the method described in Japanese Patent Application Laid-Open No. 03-204281, however, an effective knee intensity cannot be set in a case where only the luminance of the object in the center is high and the luminance of the surroundings is dark, while the knee intensity can be set effectively in a case where the luminance of the surroundings such as the sky is high. According to Japanese Patent Application Laid-Open No. 03-285470, the knee processing is determined based only on a difference between the average luminance of the entire image plane and the luminance of the center of the image plane. Thus, appropriate knee processing cannot be performed in a case where both of the luminance of the surroundings, such as the sky, and the luminance of the object in the center of the image plane are high.

SUMMARY OF THE INVENTION

The present invention is directed to an imaging apparatus capable of executing appropriate knee processing based on brightness of a main object and brightness of the surroundings, and a method for setting the same.

According to an aspect of the present invention, an imaging apparatus includes an acquiring unit configured to acquire a representative value of a luminance level in a main object area and a plurality of representative values of luminance levels in peripheral areas of the main object area in an image obtained by an imaging unit, a calculation unit configured to calculate a plurality of relative values between the respective plurality of representative values of luminance levels in the peripheral areas and the representative value of a luminance level in the main object area, which are acquired by the acquiring unit, a setting unit configured to set intensity of knee processing based on the plurality of relative values calculated by the calculation unit, and a knee processing unit configured to execute the knee processing on an image acquired by the imaging unit according to the intensity set by the setting unit.

According to another aspect of the present invention, a method for setting an imaging apparatus includes acquiring a representative value of a luminance level in a main object area and a plurality of representative values of luminance levels in peripheral areas of the main object in an image obtained by an imaging unit, calculating a plurality of relative values between the respective plurality of representative values of luminance levels in the peripheral areas and the representative value of a luminance level in the main object area, setting intensity of knee processing based on the calculated plurality of relative values, and executing the knee processing on an image acquired by the imaging unit according to the set intensity.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
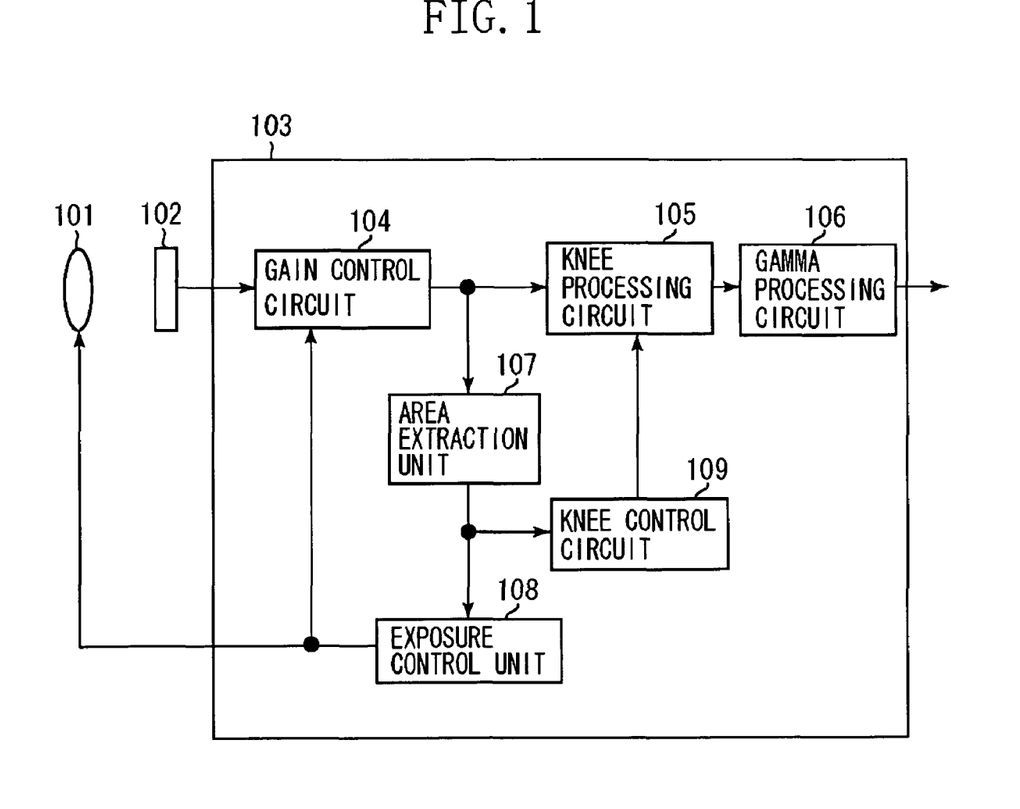
FIG. 1 is a block diagram illustrating a configuration of an imaging apparatus according to an exemplary embodiment of the present invention.

FIG. 1 illustrates a configuration of an imaging apparatus, such as a digital video camera or digital still camera, according to an exemplary embodiment of the present invention. The imaging apparatus includes an imaging lens 101, an image sensor 102, such as a CCD sensor or CMOS sensor, and a camera signal processing unit 103. An image formed by the imaging lens 101 is converted into an image signal by the image sensor 102, and then the converted image signal is further converted into a digital signal by an A/D converter (not illustrated). The converted image signal underwent necessary signal processing by the camera signal processing unit 103, and then the converted image signal is output to a recording medium as an image signal available to be recorded. The camera signal processing unit 103 includes a gain control circuit 104, a knee processing circuit 105, a gamma processing circuit 106, an area extraction unit 107, an exposure control unit 108, and a knee control circuit 109.

The gain control circuit 104 executes an appropriate gain adjustment for an image signal output from the image sensor 102 according to control of the exposure control unit 108, and then outputs the image signal thereof to an image processing block at a subsequent stage. The knee processing circuit 105 executes knee processing on the image signal based on the knee characteristics illustrated in FIG. 5. The gamma processing circuit 106 executes a gradation correction for the image signal, which has undergone the knee processing, based on a gamma table held in advance. An output signal from the gamma processing circuit 106 is executed with processes (e.g., compression and encoding), and is recorded on a recording medium (not illustrated). The output signal can also be displayed on a display panel (not illustrated). The display panel can also be used as an electronic viewfinder (EVF) even in the period while the output signal is not being recorded on a recording medium.

The area extraction unit 107 sets a predetermined area frame on a screen as described below, and detects a luminance signal level in the area. The exposure control unit 108 executes exposure control by adjusting the gain control circuit 104 and a diaphragm in the imaging lens 101 based on the detected result by the area extraction unit 107. The knee control circuit 109 sets the knee intensity based on the detected result by the area extraction unit 107.

Figure 2:
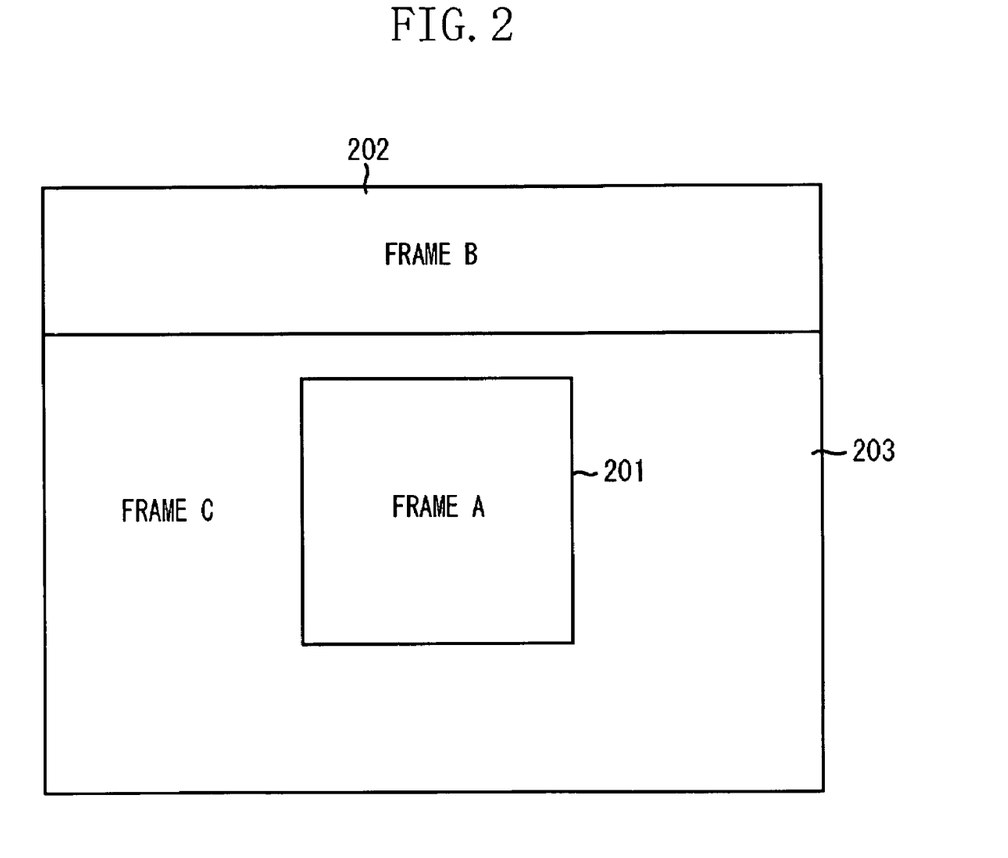
FIG. 2 illustrates area frames on a screen.

A predetermined area frame on a screen according to the present exemplary embodiment is set as illustrated in FIG. 2. A frame A 201 is positioned in the center of the screen in FIG. 2, which corresponds to an area where the main object is usually present. A frame B 202 is positioned in an upper portion of the screen, which often includes an image with high luminance such as the sky. A frame C 203 is positioned in a marginal part of the screen. The area extraction unit 107 integrates a luminance signal level of each frame, and obtains an average level thereof as a representative value.

The exposure control unit 108 adjusts gain control and a diaphragm based on the detection result obtained by placing weight on the frame A 201 positioned in the center of the screen. However, in some cases, the main object may become dark when the sky is picked up and cause a backlight state according to the imaging state, or only the image positioned in the center of the screen may be bright when, for example, the object in the center of the screen is spotlighted in a theater. The knee control circuit 109 detects such a state of the object, and sets the knee intensity to correct the high luminance portions of the object.

Figure 3:
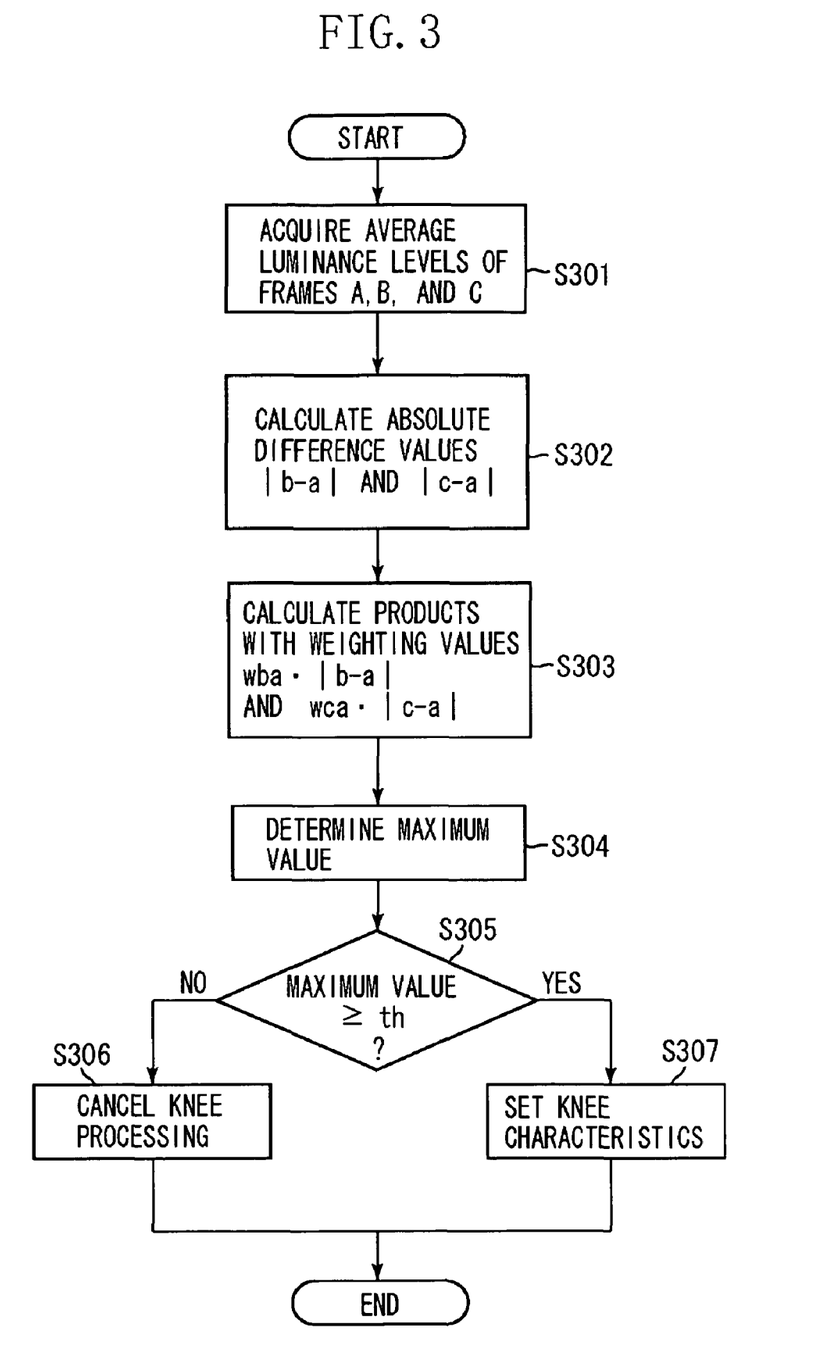
FIG. 3 is a flow chart illustrating a procedure of knee setting processing according to an exemplary embodiment of the present invention.

The detailed procedure thereof is described referring to a flow chart illustrated in FIG. 3. First, in step S301, the area extraction unit 107 acquires an average luminance level of the image signal in each frame in FIG. 2 as a representative value. For simplification, the representative values of each frame are hereinafter referred to as a, b, and c. Next, in step S302, the knee control circuit 109 calculates the relative value of each average luminance value of the frame positioned in peripheral areas, that is, the frame B 202 and the frame C 203, with reference to the average value of the frame A 201 positioned in the central area. According to the present exemplary embodiment, the absolute difference values |b-a| and |c-a| are calculated.

Next, in step S303, the knee control circuit 109 executes the predetermined weighting on each of the obtained absolute difference values. In other words, the knee control circuit 109 multiplies the absolute difference values by weighting values Wba and Wca, respectively, to obtain Wba·|b-a| and Wca·|c-a|.

Next, in step S304, the knee control circuit 109 determines the maximum value as the evaluation value from the weighted absolute values. Then, in step S305, the knee control circuit 109 compares the maximum value with a predetermined threshold value (value th).

In a case where the maximum value is less than the value th (NO in step S305), no knee processing is executed. Therefore, the knee control circuit 109 executes canceling of the knee processing in step S306. In a case where the maximum value is equal to or larger than the value th (YES in step S305), then in step S307, the knee control circuit 109 executes setting of the knee characteristics according to the maximum value. When the maximum value is more than equal to and less than twice as large as the value th, for example, the knee control circuit 109 sets weak knee characteristics by setting the knee point at kb in FIG. 5 and the knee slope as the slope of the straight line connecting the points kb and b in FIG. 5. On the other hand, when the maximum value exceeds twice as large as the value th, the knee control circuit 109 sets strong knee characteristics by setting the knee point at kc in FIG. 5 and the knee slope as the slope of the straight line connecting the points kc and c in FIG. 5. In other words, separating the maximum value into sections and relating the maximum value to the knee intensity allow the knee characteristics to be set uniquely according to the maximum value. Various information to be used for the above setting can be preliminarily stored in a memory (not illustrated) included in the knee control circuit 109.

The above-described processing can be executed only when the image capturing and recording are carried out. Alternatively, the above processing can be also executed when captured images are not recorded but displayed in real time on a display unit (not illustrated).

According to the present exemplary embodiment, the absolute difference values between the luminance level of the frame (A) 201 in the central region and the luminance level of the respective surrounding frames 202 and 203 are obtained when calculation is executed to determine whether the knee processing is needed. This is because the difference therebetween becomes larger when the object is in a backlight state including the sky in the background and when only the center of the object is bright. Furthermore, using the absolute value allows both the object in the backlight state including the sky in the background and the object of which only the center thereof is bright to obtain positive values and to be compared easily. As a result, it is easy to determine whether the knee processing is needed, only by obtaining the maximum value in step S304.

A similar result can be also obtained by executing the square operation for the difference values instead of obtaining the absolute value.

The predetermined weight to be given to respective frames can be determined according to the size of the set frame, the characteristics of the image sensor, and the setting of the exposure control at the time of image capturing.

Next, another exemplary embodiment of the present invention is described. The configuration of an imaging apparatus according to the present exemplary embodiment is similar to that of the above-described exemplary embodiment. The predetermined areas on the screen are set similar to the setting in FIG. 2.

Figure 4:
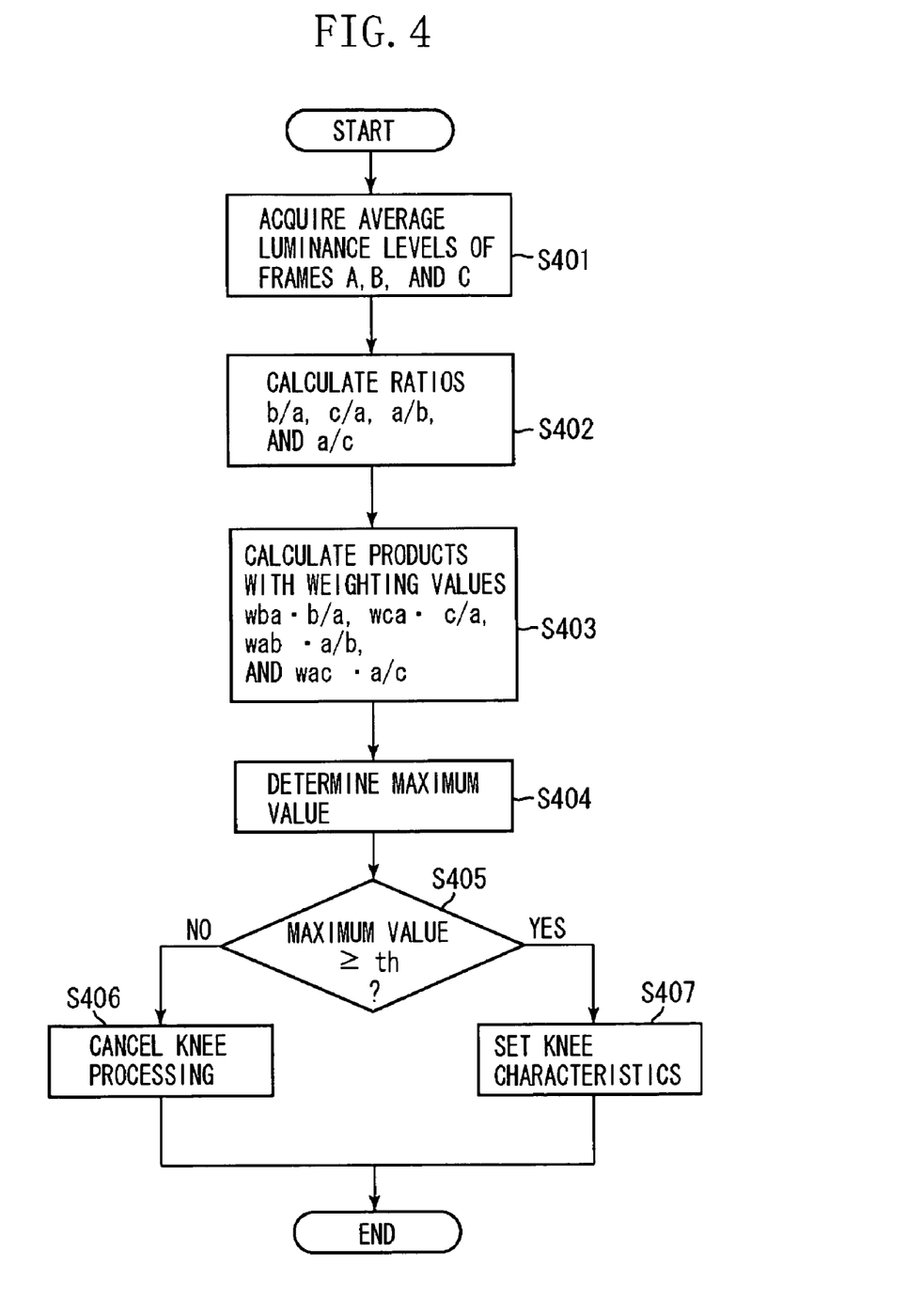
FIG. 4 is a flow chart illustrating a procedure of knee setting processing according to another exemplary embodiment of the present invention.

The detailed procedure of the knee setting according to the present exemplary embodiment is described with reference to a flow chart illustrated in FIG. 4. First, in step S401, the area extraction unit 107 acquires an average luminance level of an image signal in each frame in FIG. 2 as a representative value. For simplification, the representative value (the average luminance levels) of each frame is hereinafter referred to as a, b, and c. Next, in step S402, the knee control circuit 109 calculates the ratios as the relative values for the average luminance values of the frames in surrounding areas, the frames (B) and (C) to the value of the frame (A) 201 in the central area. When the calculation is carried out, not only the ratios to the frame (A) value (denominator) but also the ratios of the reciprocals are calculated. In other words, the values of b/a, and c/a are obtained when a/b and a/c are also calculated.

Next in step S403, the knee control circuit 109 executes predetermined weighting to each of the obtained ratios. In other words, the respective ratios are multiplied by weighting values Wba, Wca, Wab, and Wac to obtain Wba·b/a, Wca·c/a, Wab·a/b, and Wac·a/c.

Next in step S404, the knee control circuit 109 obtains the ratio to be the maximum value (the maximum ratio) from among the weighed ratios to set the ratio as the evaluation value. Then, in step S405, the knee control circuit 109 compares the maximum ratio with the predetermined threshold value (value th).

In a case where the maximum ratio is less than the value th (NO in step S405), no knee processing is executed. Therefore, the knee control circuit 109 executes canceling of the knee processing in step S406. On the other hand, in a case where the maximum value is equal to or larger than the value th (YES in step S405), then in step S407, the knee control circuit 109 sets knee characteristics according to the maximum value. More specifically, when the maximum value is equal to the value th and less than twice as large as the value th, for example, the knee control circuit 109 sets weak knee characteristics by setting the knee point at kb in FIG. 5 and the knee slope as the slope of the straight line connecting the points kb and b in FIG. 5. On the other hand, when the maximum value exceeds twice as large as the value th, the knee control circuit 109 sets strong knee characteristics by setting the knee point at kc in FIG. 5 and the knee slope as the slope of the straight line connecting the points kc and c in FIG. 5. In other words, dividing the maximum ratio region into a plurality of sections and relating the sections to the knee intensities allow the knee characteristics to be set uniquely based on the maximum value.

According to the present exemplary embodiment, when the calculation is executed for determining whether the knee processing is needed, the ratios between the luminance level of the frame (A) 201 in the central area and the luminance levels of the respective surrounding frames 202 and 203 are calculated. In addition, not only the ratios to the frame (A) value (as the denominator) but also the ratios of the reciprocal thereof are calculated. This is because the value b/a largely exceeds 1 in an object including the sky in the background while the value b/a becomes 1 or less and a/b exceeds 1 in an object where only the central part of the object is bright. In other words, by obtaining not only the ratio between frames but also the ratios of the reciprocals, either of the ratios can have a value that is larger than 1 even in the backlight state including the sky as the background and the object of which only the center is bright. As a result, it is easy to determine whether the knee processing is needed, only by calculating the maximum value in step S404. Furthermore, it is easy to execute conditional determination and relation of the ratio with the knee intensity when setting the knee intensity, because the ratio is 1 or more.

It should be noted the predetermined weight to be given to respective frames can be determined based on the size of the set frame, the characteristics of the image sensor, the setting of the exposure control at the time of image capturing, or a combination thereof.

As described above, the representative value can be determined based on the result of the calculation after the dividing an image into a central area and a plurality of surrounding areas, and then executing the predetermined calculation processing on the luminance signal level in the respective surrounding areas and the central area according to the present exemplary embodiment. Setting the knee intensity based on the representative value, thus, allows an appropriate knee setting to be executed even for an object in a backlight state including the sky as a background as well as to an object of which only the center is bright.

Though a case is described where the screen is divided into three areas as illustrated in FIG. 2 according to the exemplary embodiment, the areas can be separated into more than three. In this case, the knee setting based on the maximum value can be executed as well even though the number of the difference absolute values is increased.

Although the area extraction unit 105 is used commonly for the exposure control and the knee control according to the present exemplary embodiment, area extraction can be independently executed to control independently using an independent setting for each of the frames.

In the above exemplary embodiment, the difference values, between the central area where a main object exists and each of the surrounding areas, are calculated. However, it is not limited to this. More specifically, the main object area can be moved within the screen and determined by the user's designation. Further, if the imaging apparatus has a face detection function, the main area can be automatically set to the detected area.

In the above described exemplary embodiment, the knee intensity is determined according to the size of the maximum value when the knee setting is executed. However, the changing point of the knee intensity can be changed for each area. In a case where the determined maximum value is obtained from the frame (B) corresponding to the sky, for example, the knee point is set to have the strong knee characteristics using kc in FIG. 5 when the maximum value is more than twice as large as the value th. On the other hand, in a case where the determined maximum value is obtained from the frame (C) corresponding to sides of the main object, the knee point is set to have the strong knee characteristics using kc in FIG. 5, when the maximum value is more than three times as large as the value th. Thus, an image, in which higher luminance gradation is restrained, can be obtained even in a backlight state including the sky as the background. An image, in which higher luminance is restrained, can be obtained even when only the central object is bright if the relations of the above ratio to the settings are inverted.

The present invention is not limited to an imaging apparatus, and can also be applied to an imaging system including an imaging apparatus and a personal computer (PC) The system thereon, for example, is configured with an imaging apparatus having blocks related to image control, and a PC, to which an image is transferred, having the area extraction unit, the knee control circuit, and the knee processing circuit.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-050130 filed Feb. 29, 2008, which is hereby incorporated by reference herein in its entirety.

What is claimed is:

1. An imaging apparatus comprising:
an acquiring unit configured to acquire a representative value of a luminance level in a main object area and a plurality of representative values of luminance levels in peripheral areas of the main object area in an image obtained by an imaging unit;
a calculation unit configured to calculate a plurality of relative values between the respective plurality of representative values of luminance levels in the peripheral areas and the representative value of a luminance level in the main object area, which are acquired by the acquiring unit;
a setting unit configured to set intensity of knee processing based on the plurality of relative values calculated by the calculation unit; and
a knee processing unit configured to execute the knee processing on an image acquired by the imaging unit according to the intensity set by the setting unit,
wherein the calculation unit executes a square calculation for a difference value between each of the relative values in each of the surrounding areas and the representative value in the main object area as the relative value.

2. The imaging apparatus according to claim 1, wherein the calculation unit calculates an absolute difference value between the representative value in each of the surrounding areas and the representative value in the main object area as the relative value.

3. The imaging apparatus according to claim 1, wherein the setting unit executes setting of knee intensity according to a maximum relative value among the plurality of relative values calculated by the calculation unit.

4. The imaging apparatus according to claim 1, wherein the calculation unit calculates the relative values to be used in the setting unit by executing weighting to each of the plurality of relative values according to each of the surrounding areas.

5. The imaging apparatus according to claim 1, wherein the main object area corresponds to a central area of an image screen.

6. A method for setting an imaging apparatus, the method comprising:
acquiring a representative value of a luminance level in a main object area and a plurality of representative values of luminance levels in peripheral areas of the main object in an image obtained by an imaging unit;
calculating a plurality of relative values between the respective plurality of representative values of luminance levels in the peripheral areas and the representative value of a luminance level in the main object area;
setting intensity of knee processing based on the calculated plurality of relative values; and
executing the knee processing on an image acquired by the imaging unit according to the set intensity,
wherein calculating includes executing a square calculation for a difference value between each of the relative values in each of the surrounding areas and the representative value in the main object area as the relative value.

7. An imaging apparatus comprising:
an acquiring unit configured to acquire a representative value of a luminance level in a main object area and a plurality of representative values of luminance levels in peripheral areas of the main object area in an image obtained by an imaging unit;
a calculation unit configured to calculate a plurality of relative values between the respective plurality of representative values of luminance levels in the peripheral areas and the representative value of a luminance level in the main object area, which are acquired by the acquiring unit;
a setting unit configured to set intensity of knee processing based on the plurality of relative values calculated by the calculation unit; and
a knee processing unit configured to execute the knee processing on an image acquired by the imaging unit according to the intensity set by the setting unit,
wherein the calculation unit calculates a ratio between the representative value in each of the surrounding areas and the representative value in the main object area as the relative value, and
wherein the calculation unit further calculates a reciprocal of each of the ratios.

8. The imaging apparatus according to claim 7, wherein the setting unit executes setting of knee intensity according to a maximum relative value among the plurality of relative values calculated by the calculation unit.

9. The imaging apparatus according to claim 7, wherein the calculation unit calculates the relative values to be used in the setting unit by executing weighting to each of the plurality of relative values according to each of the surrounding areas.

10. The imaging apparatus according to claim 7, wherein the main object area corresponds to a central area of an image screen.

11. A method for setting an imaging apparatus, the method comprising:
acquiring a representative value of a luminance level in a main object area and a plurality of representative values of luminance levels in peripheral areas of the main object area in an image obtained by an imaging unit;
calculating a plurality of relative values between the respective plurality of representative values of luminance levels in the peripheral areas and the representative value of a luminance level in the main object area which are acquired;

setting intensity of knee processing based on the plurality of relative values calculated; and executing the knee processing on an acquired image according to the intensity set, wherein a ratio is calculated between the representative value in each of the surrounding areas and the representative value in the main object area as the relative value, and wherein a reciprocal of each of the ratios is calculated.

12. An imaging apparatus comprising:

an acquiring unit configured to acquire a first representative value of a luminance level in a main object area, a second representative value of luminance level in a peripheral area of the main object area, and a third representative value of luminance level in an upper portion of an image screen in an image obtained by an imaging unit;

a calculation unit configured to calculate a first relative value between the second representative value and the first representative value and second relative value between the third representative value and the first representative value;

a setting unit configured to set intensity of knee processing based on the first relative value and the second relative value calculated by the calculation unit; and a knee processing unit configured to execute the knee processing on an image acquired by the imaging unit according to the intensity set by the setting unit.

13. The imaging apparatus according to claim 12, wherein the setting unit executes setting of knee intensity according to a maximum relative value among the first or the second relative values calculated by the calculation unit.

14. The imaging apparatus according to claim 12, wherein the calculation unit calculates the relative values to be used in the setting unit by executing weighting to each of the first or the second relative values.

15. The imaging apparatus according to claim 12, wherein the main object area corresponds to a central area of an image screen.

16. A method for setting an imaging apparatus comprising:

acquiring a first representative value of a luminance level in a main object area, a second representative value of luminance level in a peripheral area of the main object area, and a third representative value of luminance level in an upper portion of an image screen in an image obtained by an imaging unit;

calculating a first relative value between the second representative value and the first representative value and second relative value between the third representative value and the first representative value;

setting intensity of knee processing based on the first relative value and the second relative value calculated; and executing the knee processing on an image acquired according to the intensity set.

* * * * *